United States Patent [19]

Church

[11] Patent Number: 5,386,843
[45] Date of Patent: Feb. 7, 1995

[54] VENTING APPARATUS AND SYSTEM FOR MARINE CRAFT FUEL TANK

[75] Inventor: John F. Church, Modesto, Calif.

[73] Assignee: Parker Hannifin Corporation, Cleveland, Ohio

[21] Appl. No.: 260,168

[22] Filed: Jun. 15, 1994

Related U.S. Application Data

[63] Continuation of Ser. No. 922,367, Jul. 29, 1992, abandoned, which is a continuation of Ser. No. 877,688, May 1, 1992, abandoned.

[51] Int. Cl.6 ............................................. F16K 24/04
[52] U.S. Cl. ................................. 137/202; 137/899.2
[58] Field of Search ................ 137/199, 202, 1, 899.2, 137/587

[56] References Cited

U.S. PATENT DOCUMENTS

| | | |
|---|---|---|
| 2,677,939 | 5/1954 | Clute ............................ 137/202 X |
| 4,487,215 | 12/1984 | Green .......................... 137/202 X |
| 4,640,304 | 2/1987 | Looney ........................ 137/202 |
| 4,854,469 | 8/1989 | Hargest . |
| 4,958,655 | 9/1990 | Danek .......................... 137/202 X |
| 4,963,169 | 10/1990 | Granville . |
| 5,019,141 | 5/1991 | Granville et al. . |
| 5,035,729 | 7/1991 | Hodgkins . |

FOREIGN PATENT DOCUMENTS

| | | | |
|---|---|---|---|
| 274633 | 7/1927 | United Kingdom | 137/202 |
| 405385 | 2/1934 | United Kingdom | 137/202 |
| 1275350 | 5/1972 | United Kingdom | 137/202 |

*Primary Examiner*—Gerald A. Michalsky
*Attorney, Agent, or Firm*—Ralph E. Jocke

[57] ABSTRACT

A apparatus (10) for enabling the discharge of air and vapor from the head space of a fuel tank while preventing the discharge of liquid therethrough, has an inlet (12) in communication with the head space and an outlet (14) in connection with atmosphere. The apparatus has an internal chamber (22). A body (54) is positioned above an orifice (44) in a retainer (36) inside the chamber. A relief element (72) with an opening (74) therethrough is positioned between the body and the outlet. When air and vapor flow through the device, Bernoulli's Principle causes the body to be suspended between the orifice and the opening in the relief element. When liquid enters the chamber, the body floats upward in the liquid and if the chamber fills with liquid, blocks the opening to prevent the discharge of liquid from the device. Liquid prevented from flowing out of chamber 22, flows back into the fuel tank when fluid is no longer being delivered into the device.

30 Claims, 4 Drawing Sheets

VENTING APPARATUS AND SYSTEM FOR MARINE CRAFT FUEL TANK

This is a continuation of copending application Ser. No. 07/922,367 filed on Jul. 29, 1992, now abandoned, which is a continuation of Ser. No. 07/877,688 filed on May 1, 1992, now abandoned.

This invention relates to marine craft that are powered by engines that burn liquid petroleum fuels. Specifically, this invention relates to fuel systems of such marine craft, and an apparatus that enables continuous venting of a fuel tank to atmosphere through a vent line while preventing the discharge of liquid fuel from the vent line to the environment.

BACKGROUND ART

Recreational boats and other marine craft are typically powered by engines that burn either gasoline or diesel fuel. Such boats have at least one fuel tank to hold the liquid fuel until it is delivered to the engine.

Conventional fuel tanks have a fill tube through which the tank may be filled with fuel from the nozzle of a conventional gas pump. A removable cap is usually installed at the end of the fill tube. The cap is removed when the fuel delivery nozzle is inserted into the fill tube to add fuel to the tank.

As liquid fuel is added to the tank, it displaces the air therein. To enable the air in the tank to escape, a vent line is typically used to connect the head space above the level of the liquid fuel in the tank, to the atmosphere. If the vent line were not provided, the air in the headspace of the tank would escape upward through the fill tube as fuel is added. This may cause fuel to splash out onto the operator. The vent line from the fuel tank is typically connected to an opening through the hull of the boat located above the water line.

The vent line also serves to maintain the head space of the tank at atmospheric pressure even when the cap is installed on the fill tube. This enables the fuel in the tank to expand with increasing temperature and prevents the build up of pressure in the tank that could otherwise cause the tank to burst. The vent line also enables fuel to be drawn from the tank to the engine by suction.

A problem with conventional marine fuel systems has been the discharge of fuel from the fuel tank vent line into the water. This problem occurs in a number of circumstances. First, when the tank is being filled with fuel, the agitation of the fuel causes the formation of foam. As the tank reaches a near full condition, the foam is pushed out the vent line into the water. Even if the amount of foam is small, some liquid fuel will usually flow out of the vent line and into the water as the tank is topped off. Some fuel systems are actually designed so that the operator knows that the tank is full when fuel is visually observed flowing out of the vent line. Also, rocking of the boat by wave action as it is being filled with fuel increases the chances that fuel will be pushed out the vent line during the fueling process.

Fuel spillage out of the vent line also occurs when the tank is full and the fuel expands with increased temperature. The expanding fuel typically passes out of the vent line and into the water. Similarly, when a boat with full fuel tanks gets underway, the wave action often causes fuel to flow out of the vent line.

The prevention of fuel spillage from a vent line has been achieved using a number of devices previously patented by the assignee of the present invention. U.S. Pat. Nos. 4,963,169, 5,019,141, and 5,035,729 disclose devices that may be installed in the vent line of a fuel tank to prevent the discharge of liquid fuel therethrough while maintaining the tank vented to atmosphere. Another attempt to solve this problem is shown in U.S. Pat. No. 4,854,469.

In some situations, when fuel is being added to a tank at a very high flow rate, the amount of air being passed through the vent line may cause problems with devices used to prevent discharge of fuel. When using devices like those shown in U.S. Pat. No. 5,019,141, Applicant has found that the buoyant check ball used to prevent the flow of fuel through the device, may be displaced by high air and vapor flow to a position which restricts the flow of air and vapor through the device. Such restriction may occur even when no liquid is present. When this happens, the ability of the device to maintain the tank vented to atmosphere is adversely affected. This may result in premature shut off of the fuel fill nozzle or require filling the fuel tank at a somewhat slower rate. This is not desirable as recreational boaters often want to fill their fuel tanks as rapidly as possible.

Thus, there exists a need for a device that prevents the discharge of liquid fuel through a fuel tank vent line but which enables the passage of air and vapor therethrough at high flow rates.

DISCLOSURE OF INVENTION

It is an object of present invention to provide an apparatus that prevents the passage of liquid therethrough while enabling the passage of vapor at high flow rates.

It is a further object of the present invention to provide an apparatus that prevents the discharge of liquid through a fuel tank vent line.

It is a further object of the present invention to provide an apparatus that maintains a head space of a fuel tank in fluid communication with atmosphere.

It is a further object of the present invention to provide an apparatus that is reliable, and economical to manufacture and use.

It is a further object of the present invention to provide a system that prevents the discharge of liquid fuel from the fuel tank vent line of a boat while maintaining the fuel tank in communication with atmosphere.

It is a further object of the present invention to provide a system that prevents the discharge of liquid fuel from a fuel tank vent line of a boat and enables air to pass out of said tank at high flow rates as the tank is filled with fuel.

Further objects of the present invention will be made apparent in the following Best Mode for Carrying Out Invention and the appended claims.

The foregoing objects are accomplished in the preferred embodiment of the invention by an apparatus which is mounted in the fuel tank vent line of a boat. The apparatus is in fluid communication with the head space of the fuel tank through the vent line. The apparatus has a body enclosing a chamber. The body has an inlet in fluid communication with the head space of the tank which enables fluid to enter and leave the chamber. The apparatus also has an outlet which is connected to a hose which is open to atmosphere. The outlet is in fluid communication with the chamber through an opening inside the body.

A spherical body is positioned inside the chamber. The body is held in a retainer assembly which includes a bowl shaped lower pocket. The pocket is bounded by a lower wall having circular orifice centered therein. The diameter of the orifice is substantially smaller than the diameter of the spherical body.

An upper portion of the retainer assembly includes a plurality of outwardly tapered arms. The arms are spaced apart so that fluid may pass between the arms but the body cannot. The arms are also tapered so that the body is directed back into the pocket when it falls downward under the force of gravity.

The body is a hollow sphere which has a density greater than air and fuel vapor, but less than the density of liquid fuel. As a result, the body will float in liquid fuel.

An opening to the outlet of the device is positioned in a seat which is located vertically above the spherical body and the retainer. The seat is sized to enable the body to be accepted therein and to block flow through the opening when the body is in abutting contact therewith. When liquid fuel from the fuel tank passes into the body and fills the chamber, the body floats and abuts the seat. This prevents the flow of liquid out of the apparatus and into the water.

In the preferred embodiment of the invention, the seat and opening are positioned on a relief element that is movable inside the chamber. The relief element is movable between a first position wherein any flow of fluid to the outlet of the apparatus must pass through the opening; and a second position. The second position is upwardly disposed from the first position. In the second position, fluid may flow past the relief element even though the opening therein is blocked by the body. The relief element is biased towards the first position by a spring.

When the chamber fills with liquid fuel, the body blocks the opening and prevent flow out of the apparatus. However, if the pressure in the chamber builds and becomes sufficiently high that it presents a safety risk, the relief element will move against the force of the spring to allow the liquid to escape from the chamber. This avoids the dangerously high pressures that could rupture the tank.

During normal operation of the apparatus when the tank is being filled with fuel, air from the head space of the tank flows out of the tank and into the inlet of the apparatus. Air entering the chamber inside the apparatus passes through the orifice under the body as well as through a plurality of secondary openings laterally disposed to the orifice.

As a result of the air flowing upward through the orifice, the body rises. However, in accordance with Bernoulli's Principle of fluid flow, the high speed of vapor flow through the orifice causes an area of lower fluid pressure in the area near the bowl shaped pocket. This area of lower pressure results in the ball being suspended above the orifice and yet disposed away from the opening in the relief element. This effect maintains the body in suspension and prevents it from travelling to a location where it could restrict vapor flow out of the device. Bernoulli's Principle prevents the ball from restricting flow through the chamber regardless of the flow rate.

When liquid fuel enters the chamber, the liquid level rises and eventually blocks flow of vapor through the orifice. When this occurs, the body is no longer suspended in vapor flow and the body falls to be suspended in the liquid. Eventually, if the liquid continues to rise, the body will come into abutting contact with the seat, blocking the opening in the relief element. This prevents liquid from flowing out of the device and into the water. In this condition, the body will continue to block flow through the device until the liquid begins to flow back to the tank through the inlet or the pressure rises to the point where the relief element allows the liquid to escape.

BEST MODE FOR CARRYING OUT INVENTION

Figure 1:
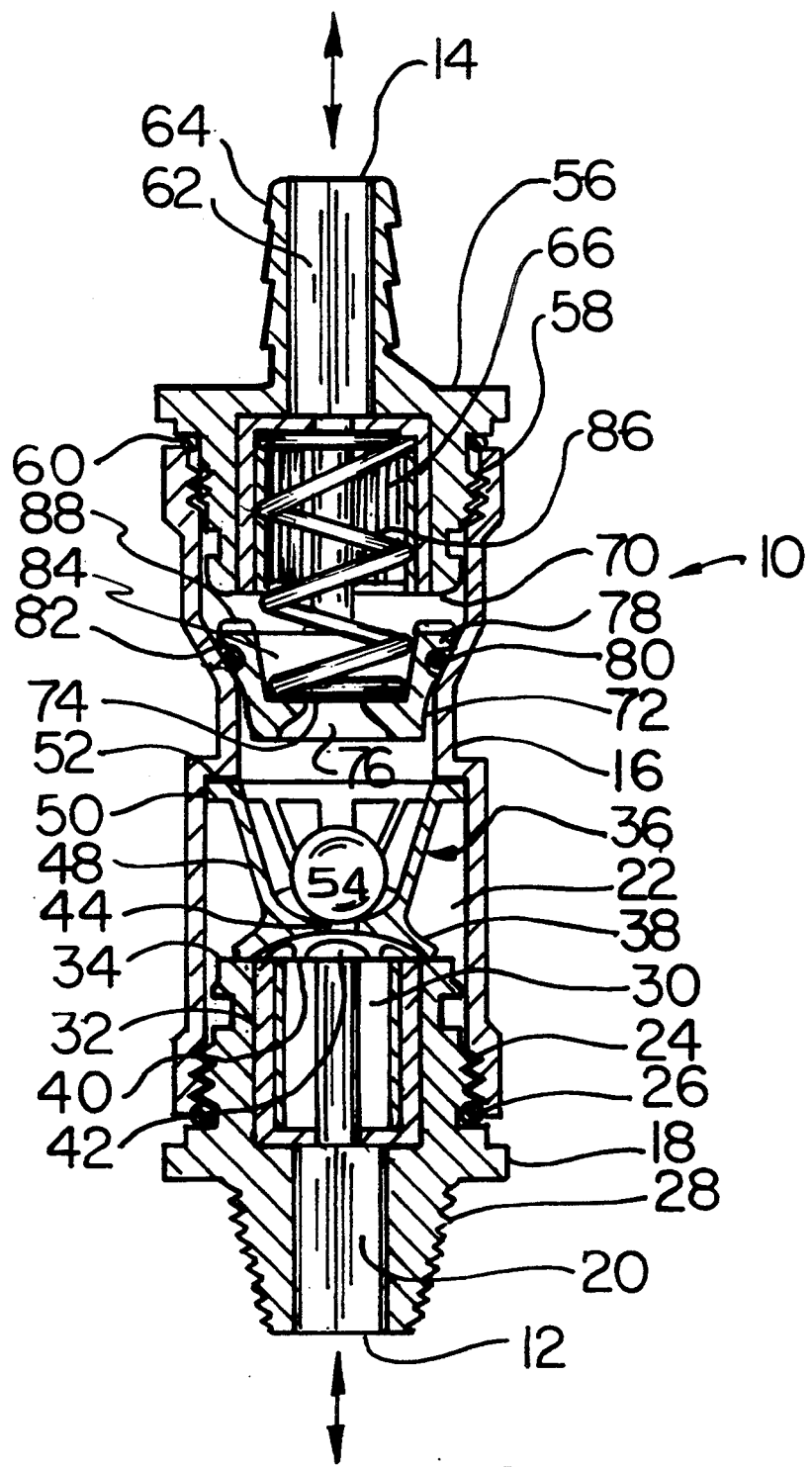
FIG. 1 is a cross sectional view of the venting apparatus for a marine craft fuel tank shown in a no vapor flow condition.

Referring now to the drawings and particularly to FIG. 1, there is shown therein a cross sectional view of the venting apparatus for a marine craft fuel tank of the preferred embodiment of the present invention generally indicated 10. The device has an inlet 12 and an outlet 14. The inlet is in fluid communication with a head space of a fuel tank (not shown) of a boat. The outlet is in fluid communication with atmosphere which is typically achieved using a hose or tube (not shown) attached to the outlet.

The device has a central body portion 16. Central body portion 16 is attached at its lower end to a first end fitting 18. Inlet 12 is in fluid communication with a fluid passage 20 that extends through first end fitting 18. Fluid passage 20 is open to an internal chamber 22 inside the central body portion.

First end fitting 18 has a first threaded portion 24 that is accepted by a mating threads on the central body portion 16. A seal 26 is positioned in a recess (not separately shown). Seal 26 serves to maintain the first end fitting and central body portion in fluid tight relation.

A second threaded portion 28 of first end fitting 18 extends downward and away from central body portion 16. Threaded portion 28 is adapted for engaging a fitting which enables the delivery of liquid and vapor to and from the head space of the fuel tank.

Fluid passage 20 of the first end fitting 18 also includes a mounting area 30 which is adjacent chamber 22. Mounting area 30 is generally circular in cross section, however, a plurality of longitudinal projections 32 extend inward in mounting area 30. The purpose of projections 32 is later explained. First end fitting 18 terminates adjacent chamber 22 at a flat surface 34.

A retainer 36 is positioned inside central body portion 16. Retainer 36 comprises a lower scalloped flanged portion 38. Flange portion 38 includes a plurality of projections 40 which abut flat surface 34. A plurality of fluid openings 42 extend between projections 40.

Figure 2:
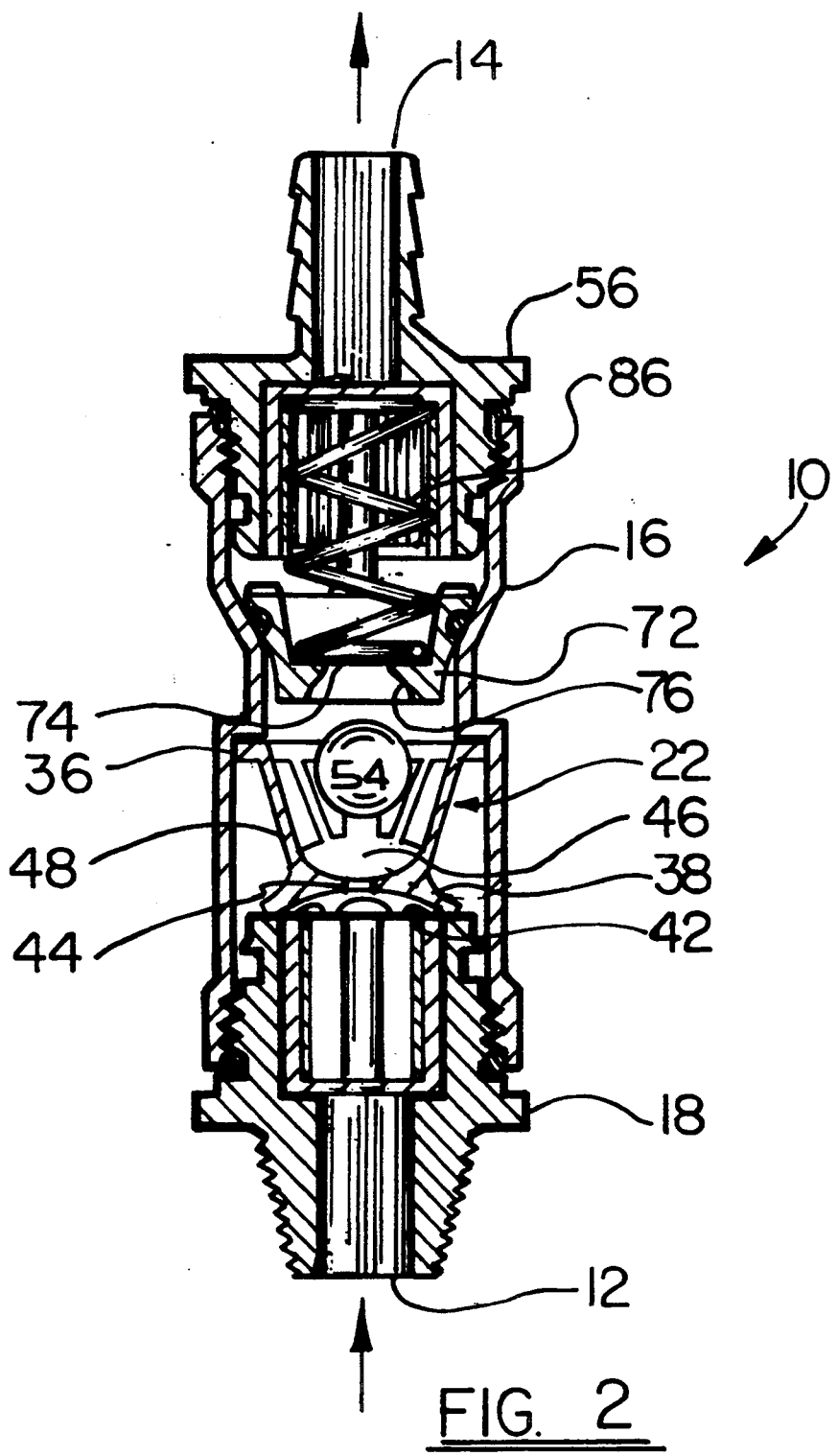
FIG. 2 is a cross sectional view of the apparatus in a vapor flow condition.

An orifice 44 extends upward through the center of flange portion 38 to a bowl shaped opening or pocket 46 (see FIG. 2). A plurality of arms 48 extend radially outward and upward from the bowl shaped pocket. The arms terminate in a circumferentially extending lip 50. Lip 50 is in abutting contact with a step 52 inside central body portion 16. In the preferred form of the invention, the lip is held against step 52 by the action of first end fitting 18 pressing against the scalloped flange portion 48 of retainer 36.

A spherical body 54 is positioned in the bowl shaped pocket 46 of retainer 36 as shown in FIG. 1 when there is no vapor or liquid flow through the device. Body 54, in the preferred form of the invention, is a hollow aluminum ball. The body has a density greater than the density of fuel vapor and air, but less than the density of liquid fuel. As a result, the body will float in liquid fuel.

A second end fitting 56 is attached to central body portion 16 at the body portion's upper end. Second end fitting 56 is similar to first end fitting 18 in that it includes a threaded portion 58 for engaging threads on the central body portion and has an associated seal 60 for maintaining the end fitting and central body portion in fluid tight relation.

Second end fitting 56 has a fluid passage 62 in fluid communication with outlet 14. However, unlike the first end fitting, the second end fitting 56 incorporates a hose barb 64 for attaching a hose to the outlet.

The second fluid passage 62 in second end fitting 56, like the fluid passage in the first end fitting, includes a mounting area 66 with longitudinally extending projections 68. Second end fitting 56 terminates inwardly at a surface 70.

A relief element 72 is positioned inside the central body portion above retainer 36. The relief element 72 has an opening 74 therethrough which is surrounded by a tapered seat 76. The opening 74 and seat 76 are sized to accept body 54, but to prevent the body from passing therethrough. Thus, when body 54 is adjacent opening 74, flow therethrough is prevented.

Relief element 72 has a circumferentially enlarged portion 78. Enlarged portion 78 includes a recess (not separately shown) which houses a seal 80. Central body portion 16 includes an inwardly tapered inner wall portion 42. In the position of relief element 72 shown in FIGS. 1 and 2, tapered wall portion 82 abuts seal 80 and the enlarged portion 78 of the relief element.

Relief element 72 also has a recess 84. Recess 84 is sized for accepting a compression spring 86. Spring 86 extends from the recess 84, through the mounting area 66 of the second end fitting, and abuts an upper surface thereof. The projections 68 that extend radially inward in the mounting area, support the spring, while enabling the flow of fluid around the spring as well as through fluid passage 62. The preferred embodiment of the invention also includes radially spaced upwardly pointed projections 68 on the relief element 72. The purpose of the projections 88 is later explained with respect to operation of the device.

Figure 3:
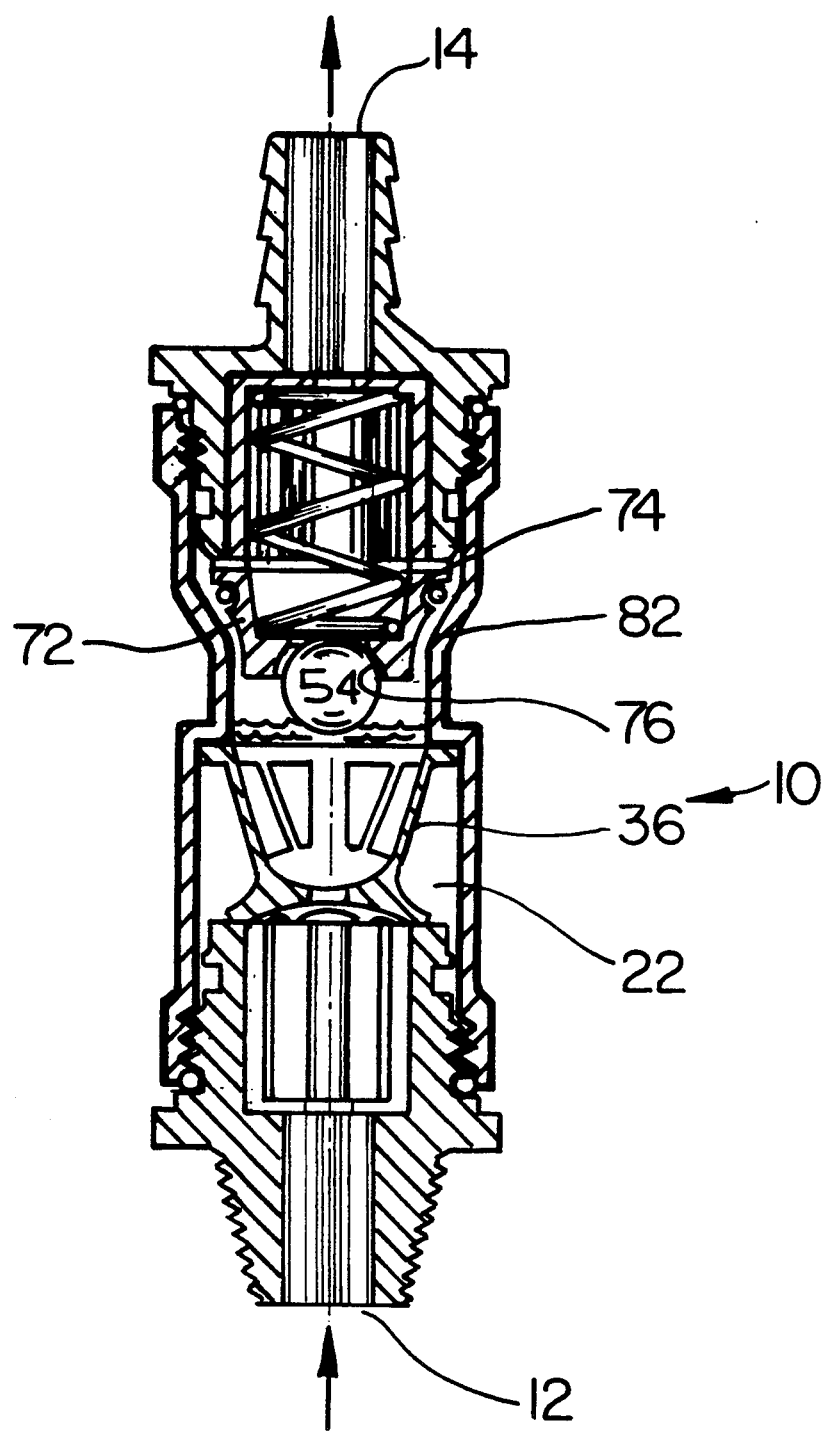
FIG. 3 is a cross sectional view of the apparatus in a liquid relief condition.

In the preferred embodiment of the invention shown in FIGS. 1 through 3, both end fittings 18 and 56, include similar mounting areas. This enables the end fittings to be interchanged and enables the connection of the inlet or the outlet of the device to either a threaded coupling or hose as desired. Of course, in other embodiments of the invention, identical end fittings may be provided so that both ends of the device are connected either to a threaded coupling or to a hose.

Figure 4:
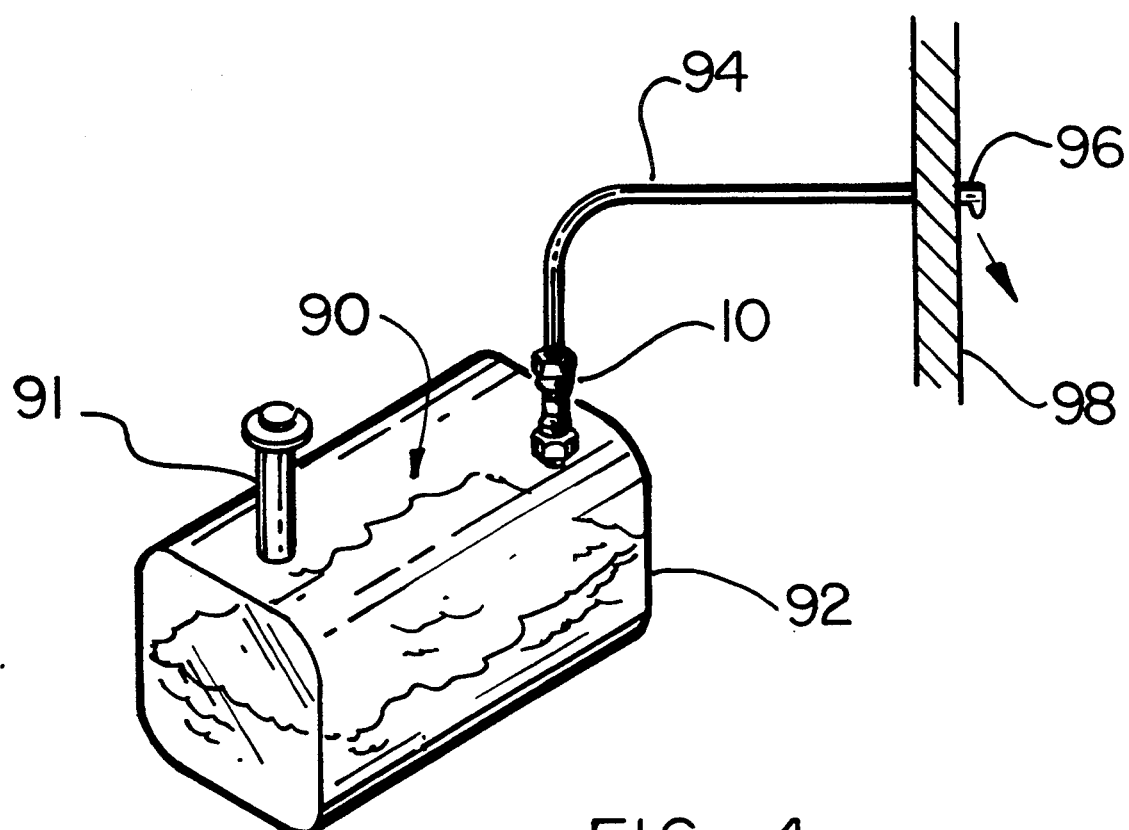
FIG. 4 is a schematic view of a fuel tank and the venting apparatus of the present invention.

When installed in a boat, as shown in FIG. 4, the apparatus 10 is mounted on an upper surface of a boat's fuel tank 92 in the generally vertical orientation shown in FIGS. 1 through 3. A fill tube 91 enables fuel to enter the interior of the tank. The inlet 12 is in fluid connection with the head space 90 of the boat's fuel tank. The outlet 14 is connected to a hose 94 or other conduit which enables the outlet to be open to atmosphere through an outlet fitting 96 on the hull 98 of the boat.

When there is no significant vapor flow out of or into the head space of the fuel tank, the body 54 is disposed downward by the force of gravity and is supported in the bowl shaped pocket 46 of the retainer 36 as shown in FIG. 1.

When the body is in the position shown in FIG. 1, air and vapor may flow through the apparatus in both directions as indicated by the arrows adjacent the inlet and outlet. Although body 54 is adjacent and in blocking relation with orifice 44, vapor is enabled to flow through the secondary openings 42 between projections 40 and the flange portion 38 of the retainer. In this condition, air may enter the fuel tank as fuel is withdrawn from the tank to run the engine of the boat. Also, air and vapor are free to gradually flow out of the tank and through the device as the fuel in the tank expands due to increasing temperature.

When fuel is added to the tank, the air in the head space is rapidly displaced. This causes air and vapor to rush out of the tank and into inlet 12. The rapid and high velocity flow of air and vapor causes air to flow through orifice 44 as well as through openings 42. The flow through orifice 44 displaces body 54 upward to the position shown in FIG. 2.

The rapid flow of air and vapor through orifice 44 creates an area of lower fluid pressure in the area of the bowl shaped pocket 46. This area of low pressure results due to Bernoulli's Principle which predicts that pressure will be lower in an area of higher velocity fluid flow. As a result, the body 54 remains suspended over the orifice 44. Regardless of the air and vapor flow rate through the device, body 54 will remain suspended between orifice 44 and opening 74 in the relief element. As a result, body 54 does not move to restrict flow out of the device through opening 74, regardless of the rate of flow.

Vapor and air which enter chamber 22 are normally allowed to pass through the opening 74 in relief element 72, and out the outlet 14 of the device to atmosphere. As the vapor and air pass through chamber 22, turbulence will normally occur. However, body 54 is prevented from moving significantly away from a location vertically above orifice 44 by the arms 48 of retainer 36. As a result, arms 48 serve as cage means for preventing the movement of body 54 laterally away from the orifice.

When vapor and air flow through the device falls due to termination of the fueling process, the arms also direct the body as it moves downward due to gravity into bowl shaped pocket 46. Pocket 46 serves as nesting means for the body, holding it in centered relation over orifice 44 during no or low vapor flow conditions. The bowl shaped pocket 46 aids in keeping body 54 properly positioned so that it will again be properly suspended inside chamber 22 when vapor and air again flow through the device at a high flow rate.

During the process of filling the fuel tank, a point will be reached when the tank is almost full and foam and liquid fuel begin to be pushed out of the head space and into the inlet of the device. As the chamber 22 begins to fill with liquid or foam, the flow of air and vapor through orifice 44 will stop. As a result body 54 will no longer be suspended. The body will then fall until it is supported by the liquid due to buoyancy effects. If the liquid inside chamber 22 rises sufficiently, the body will be pushed adjacent to seat 76 of relief element 72 as shown in FIG. 3. In this position, body 54 blocks flow of liquid through the device and prevents the discharge of fuel through the outlet.

The blockage of flow by the body through the opening in the relief element causes back pressure inside chamber 22 which is transmitted to the head space of the fuel tank. This is usually sufficient to shut off the pressure sensitive shut off switch of a standard fuel nozzle used for fueling recreational marine craft. As a result, fuel flow into the tank will be stopped and any liquid in the interior of the chamber of the device will flow back into the tank through inlet 12. Once the fueling has stopped, foam which is caused the device to shut off flow will typically break and settle, so that the fuel tank may be slowly topped off. As a result, fuel will not be discharged through the apparatus 10 into the water.

In some unusual circumstances, the apparatus may fill with fuel and the body will abut the opening in the relief element, however pressure continues to build in the head space of the tank. In this condition, if the pressure is allowed to continue to increase, the fuel tank could rupture.

To prevent the build up of excessive pressure in the fuel tank, the present invention provides for relieving chamber 22 to atmosphere in the event the pressure therein exceeds about 2.4 psig. In the event the pressure exceeds this amount, the buoyant forces on body 54 acting against the relief element overcomes the opposing force applied to the relief element by spring 86. When this occurs, the relief element moves vertically upward to the position shown in FIG. 3. In this position, fuel is enabled to flow between the enlarged portion 78 of the relief element and the tapered wall portion 82 of central body portion 16. The pressure in chamber 22 and the fuel tank is thus relieved. Projections 88 on the relief element prevent movement of the element so far that it would restrict flow in a relief condition. As soon as the pressure returns to a safe level, the relief element moves downward under spring force to again allow the device to operate normally.

It will be understood by those skilled in the art that the present invention may be incorporated into devices of the type shown in U.S. Pat. Nos. 5,019,141 and 5,035,729. These devices include other elements and features for aiding in the prevention of discharge of liquid fuel into the marine environment.

Thus, the venting apparatus of the present invention achieves the above stated objectives, eliminates difficulties encountered in the use of prior devices and systems, solves problems and attains the desirable results described herein.

In the foregoing description, certain terms have been used for brevity, clarity and understanding, however, no unnecessary limitations are to be implied therefrom because such terms are used for descriptive purposes and are intended to be broadly construed.

Moreover, the descriptions and illustrations given are by way of examples and the invention is not limited to the exact details shown or described.

Having described the features, discoveries and principles of the invention, the manner in which it is utilized, and the advantages and useful results obtained; the new and useful structures, devices, elements, arrangements, parts, combinations, systems, equipment, operations, methods and relationships are set forth in the appended claims.

I claim:

1. Apparatus enabling the discharge of vapor therethrough to atmosphere from the headspace of a vehicle fuel tank while preventing the passage of liquid therethrough, and for enabling passage of vapor from the atmosphere therethrough to said headspace, comprising:

an enclosed chamber;
a first opening in said chamber, said first opening in fluid connection with said headspace;
a second opening in said chamber, said second opening in fluid connection with atmosphere;
an orifice in said chamber, said orifice disposed between said first and second openings;
a movable body in said chamber, said body configured to block said second opening when disposed adjacent thereto, and wherein said movable body floats in said liquid;
a retainer in said chamber extending between said second opening and said orifice, said retainer having an interior area, said body movable in said interior area of said retainer between an undisplaced position adjacent said orifice and a blocking position abutting said second opening, and wherein said retainer prevents movement of said body in a traverse direction from said orifice and directs said body into centered relation with said orifice when said body moves adjacent thereto; wherein when vapor flows through said chamber from said first opening to said second opening, vapor flow through said orifice produces an attractive force holding said body away from said second opening.

2. The apparatus according to claim 1 wherein said retainer comprises a plurality of arm members extending radially outward from said orifice and between said orifice and said second opening.

3. The apparatus according to claim 1 wherein said retainer comprises a bowl shaped pocket, said body acceptable in said pocket, and wherein said orifice includes an opening in said bowl shaped pocket.

4. The apparatus according to claim 1 and further comprising at least one secondary flow passage between said first opening and said interior area of said retainer, said secondary flow passage fluidly separated from said orifice, whereby fluid is enabled to flow through said apparatus from atmosphere to said headspace when said body is adjacent said orifice.

5. The apparatus according to claim 1 wherein in an operative position of said apparatus said second opening is positioned vertically above said orifice.

6. The apparatus according to claim 1 wherein said body is a spherical body having a density greater than said vapor and less than said liquid.

7. The apparatus according to claim 6 wherein said retainer comprises a bowl shaped pocket, said spherical body acceptable in said pocket in nested relation, and wherein said orifice comprises an opening in said bowl shaped pocket, and wherein said retainer further comprises a plurality of circumferentially spaced arm members extending radially outward from said orifice and between said orifice and said second opening, and wherein in the operative condition of said apparatus said second opening is vertically higher than said orifice, whereby when said spherical body falls it is directed into said pocket.

8. Apparatus enabling the passage of vapor therethrough while preventing the discharge of liquid therethrough, comprising:

an enclosed chamber;
a first opening in said chamber;
a second opening in said chamber;
a retainer in said chamber, said retainer having an interior area, said retainer having an orifice at a first end thereof adjacent said first opening, and wherein said second opening is accessible from said interior area of said retainer at a second end thereof;

a body movable in said interior area of retainer, said body blocking said second opening when adjacent thereto, said body floatable in said liquid;

wherein when vapor flows through said chamber from said first opening to said second opening, said orifice produces a low pressure area adjacent said orifice, whereby said body is held away from said second opening.

9. The apparatus according to claim 8 wherein said apparatus further comprises a secondary flow passage separate from said orifice and extending in said chamber and providing fluid communication between said first opening and said interior area of said retainer, whereby fluid is enabled to flow from said second opening to said first opening when said body is adjacent to said orifice.

10. The apparatus according to claim 9 wherein said first opening is connected to a headspace of a vehicle fuel tank and said second opening is connected to atmosphere, whereby vapor is enabled to pass between said headspace and atmosphere through said apparatus and the passage of liquid from said fuel tank through said apparatus is prevented.

11. The apparatus according to claim 9 wherein said retainer includes a scalloped flange portion having projections thereon and wherein said secondary flow passage includes an opening bounded by said projections.

12. The apparatus according to claim 8 wherein said retainer comprises a plurality of arm members, said arm members extending radially outward from said orifice and between said orifice and said second opening, and wherein said body is guided by said arm members into centered relation of said orifice as said body approaches said first end of said retainer.

13. The apparatus according to claim 12 wherein said retainer further comprises a bowl shaped pocket adjacent said first end of said retainer, and wherein said body is acceptable in said bowl shaped pocket in nested relation, and wherein said orifice comprises an opening in said bowl shaped pocket.

14. The apparatus according to claim 13 and further comprising at least one secondary flow passage extending between said interior area of said retainer and said chamber, whereby fluid is enabled to pass from said second opening to said first opening when said body is nested in said pocket adjacent said orifice.

15. The apparatus according to claim 14 wherein said secondary flow passages include openings traversely disposed from said bowl shaped pocket.

16. The apparatus according to claim 8 wherein said retainer comprises a bowl shaped pocket adjacent said first end, and wherein said orifice comprises an opening in said bowl shaped pocket.

17. The apparatus according to claim 8 wherein said first opening, second opening and orifice are aligned coaxially.

18. Apparatus for enabling the passage of vapor therethrough while preventing the passage of liquid therethrough comprising:
an enclosed chamber;
a first opening in said chamber;
a second opening in said chamber;
an orifice in said chamber disposed between said first and second openings;

a body movable in said chamber between said orifice and said second opening, wherein said body blocks fluid flow through said second opening when adjacent thereto, and wherein said body floats in said liquid;

a plurality of arm members extending between said orifice and said second opening, said members disposed in surrounding relation of said body and preventing movement of said body traversely away from said orifice, and wherein said body is movable within an interior area bounded by said arm members between a position adjacent said orifice and a position in adjacent blocking relation with said second opening, and wherein when vapor flows from said first to said second opening said orifice produces an attractive force holding said body away from said second opening.

19. The apparatus according to claim 18 wherein said apparatus further comprises a bowl shaped pocket, and wherein said orifice includes an opening in said bowl shaped pocket.

20. The apparatus according to claim 18 wherein said arm members extend radially outward from said orifice and toward said second opening.

21. The apparatus according to claim 18 wherein said apparatus further comprises a flow passage between said first and second openings separate from said orifice, whereby fluid is enabled to flow from said second opening to said first opening when said body is adjacent said orifice.

22. The apparatus according to claim 21 wherein said first opening is connected to a headspace of a vehicle fuel tank and the second opening is connected to atmosphere, whereby vapor is enabled to flow from said headspace to atmosphere through said apparatus and vice versa, and discharge of liquid through said apparatus from said headspace is prevented.

23. The apparatus according to claim 18 wherein said apparatus further comprises a retainer, said retainer including said arm members, and further comprising a bowl shaped pocket, said orifice including an opening in said bowl shaped pocket.

24. The apparatus according to claim 23 wherein said arm members extend radially outward in centered relation of said bowl shaped pocket.

25. The apparatus according to claim 18 wherein in an operative condition of said apparatus said second opening is positioned vertically above said orifice.

26. The apparatus according to claim 18 wherein said body is a sphere.

27. Apparatus for enabling the passage of vapor therethrough while preventing the passage of liquid therethrough comprising:
an enclosed chamber;
first means for providing fluid communication to and from the chamber;
second means for providing fluid communication to and from the chamber;
an orifice means in the chamber for producing an area of lower fluid pressure upon the passage of vapor therethrough;
a body movable in the chamber between positions adjacent said orifice means and adjacent said second fluid communication means, wherein said body blocks said second fluid communication means when adjacent thereto, and wherein said body floats in said liquid; cage means for preventing movement of said body in a traverse direction from said orifice means;

wherein when vapor passes through said chamber from said first means to said second means said orifice means is operative to hold said body adjacent to said orifice means whereby said body does not block flow through said second fluid communication means.

28. The apparatus according to claim 27 and further comprising nesting means for holding said body in centered relation of said orifice means when said body is adjacent thereto.

29. The apparatus according to claim 27 and further comprising secondary flow means fluidly separate from said orifice means for passing fluid between said first fluid communication means and said cage means, whereby fluid is enabled to pass from said second fluid communication means to said first fluid communication means when said body is adjacent said orifice means.

30. The apparatus according to claim 29 wherein the first fluid communications means is connected to a headspace of a vehicle fuel tank and the second fluid communication means is connected to atmosphere.

* * * * *